United States Patent
Förg

(10) Patent No.: US 10,669,710 B2
(45) Date of Patent: Jun. 2, 2020

(54) FIREPROOF PROFILE, FIREPROOF JOINT ASSEMBLY, AND METHOD FOR ASSEMBLING A FIREPROOF JOINT ASSEMBLY

(71) Applicant: Hilti Aktiengesellschaft, Schaan (LI)

(72) Inventor: Christian Förg, Lamerdingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 16/347,972

(22) PCT Filed: Dec. 7, 2017

(86) PCT No.: PCT/EP2017/081765
§ 371 (c)(1),
(2) Date: May 7, 2019

(87) PCT Pub. No.: WO2018/130347
PCT Pub. Date: Jul. 19, 2018

(65) Prior Publication Data
US 2019/0284799 A1    Sep. 19, 2019

(30) Foreign Application Priority Data

Jan. 11, 2017 (EP) .................... 17150967

(51) Int. Cl.
*E04B 1/94* (2006.01)
*E04B 2/74* (2006.01)

(52) U.S. Cl.
CPC ............ *E04B 1/948* (2013.01); *E04B 2/7411* (2013.01)

(58) Field of Classification Search
CPC . E04B 1/948; E04B 1/94; E04B 1/947; E04B 2/7411
See application file for complete search history.

(56) References Cited

U.S. PATENT DOCUMENTS

| 4,430,832 A | 2/1984 | Kaiser et al. |
| 8,375,666 B2 | 2/2013 | Stahl, Jr. et al. |
| 9,719,253 B2 | 8/2017 | Stahl, Jr. et al. |
| 2009/0049781 A1 | 2/2009 | Pilz et al. |

(Continued)

FOREIGN PATENT DOCUMENTS

FR    2.079.734    11/1971

OTHER PUBLICATIONS

International Search Report dated Feb. 15, 2018 in PCT/EP2017/081765 with English translation.
Written Opinion dated Feb. 15, 2018 in PCT/EP2017/081765.

*Primary Examiner* — Andrew J Triggs
(74) *Attorney, Agent, or Firm* — Grüneberg and Myers PLLC

(57) ABSTRACT

A fireproof profile may be used for sealing a structural joint, in particular a connection joint between a dry wall and a ceiling. The fireproof profile includes a profiled element which has an inner face and an outer face arranged opposite the inner face and has an inner section, at least one arc section, and at least one side section. The side section is connected to the inner section via the arc section. The fireproof profile further includes at least one intumescent element made of an intumescent material. The arc section has a wall thickness which optionally differs from the wall thickness of the inner section and/or of the side section.

20 Claims, 7 Drawing Sheets

(56) References Cited

U.S. PATENT DOCUMENTS

| | | | | |
|---|---|---|---|---|
| 2009/0094912 A1* | 4/2009 | Klein | ............... | E04B 2/7411 52/232 |
| 2011/0011019 A1* | 1/2011 | Stahl, Jr. | ............... | E04B 1/948 52/232 |
| 2011/0247281 A1* | 10/2011 | Pilz | ............... | E04B 2/7411 52/173.1 |
| 2014/0196391 A1* | 7/2014 | Pilz | ............... | E04B 1/946 52/232 |
| 2015/0275507 A1* | 10/2015 | Klein | ............... | A62C 2/065 277/628 |
| 2015/0368898 A1* | 12/2015 | Stahl, Jr. | ............... | E04B 2/7409 277/647 |

\* cited by examiner

FIREPROOF PROFILE, FIREPROOF JOINT ASSEMBLY, AND METHOD FOR ASSEMBLING A FIREPROOF JOINT ASSEMBLY

The invention relates to a fire-protection profile for sealing a building-structure joint, especially a connecting joint between a drywall and a ceiling. Moreover, the invention relates to a fire-protection-joint assembly having a fire-protection profile as well as a method for assembly of a fire-protection building-structure joint.

Several known solutions exist for sealing a joint between a drywall and another building-structure part, for example a concrete ceiling in fireproof manner. For example, a sealing compound may be introduced into the existing gap, but this involves laborious processing and, due to the curing of the sealing compound, permits only limited absorption of movement. This is disadvantageous when the joint changes its expansion, for example due to fluctuating temperature.

Diverse drywall profiles have also been described already, an example being a profile having intumescent elements slipped onto it as in US 2015/0368898 A1. Even here, however, the problem exists of ensuring adequate absorption of movement. Moreover, additionally inserted profiles often adversely influence the visual impression of the building-structure joint.

The object of the invention is to achieve the sealing of a building-structure joint having a fire-protection function, a large capacity to absorb movements and a corresponding visual impression.

This object is solved with the features of claim 1. The fire-protection profile for sealing a building-structure joint, especially a connecting joint between a drywall and a ceiling, has a profile element, which comprises an inner side as well as an outer side disposed opposite the inner side, and an inner portion as well as at least one arch portion and at least one wing portion. The wing portion is joined via the arch portion to the inner portion. Moreover, at least one intumescent element of intumescent material is provided. In an alternative embodiment, the fire-protection profile consists completely of a flame-retardant and intumescent material. The arch portion has a wall thickness that differs if necessary from the inner portion and/or the wing portion. The change of the wall thickness in the arch portion makes it possible to join the wing portion pivotally to the inner portion and at the same time to provide adequate flexibility and deformability in the arch portion to compensate in simple manner for expansion movements of the building-structure joint. Fire protection is assured due to the integrated intumescent element.

Via the wall thickness of the arch portion, its deformation properties can be easily adjusted, wherein a thinner wall thickness results in higher flexibility and thus a definite elastic deformation at smaller force effort, whereas a thickness wall thickness improves the stability of the fire-protection profile and possibly offers better fire-protection properties.

The profile element is preferably formed in one piece, wherein the inner portion, the arch portion and the wing portion merge into one another and may be made of the same material, for example a suitable plastic. The intumescent element can be mounted simply on the prefabricated profile element.

Preferably, the arch portion has a wall thickness that is smaller at least in portions than the inner portion and/or of the wing portion, so that the arch portion is deformable in response to a smaller force effort than is the inner portion or the wing portion.

In a preferred embodiment, the arch portion is constructed in double-walled manner and has an inner and an outer arch portion, wherein the inner arch portion is formed as a strut having a first linking portion and a second linking portion and together with the outer arch portion forms a chamber. This chamber extends perpendicular to the cross section of the fire-protection profile and preferably over the entire length of the fire-protection profile parallel to the building-structure joint.

Between the two linking portions, preferably a predetermined bending point is provided, at which the two linking portions are able to pivot relative to one another. The predetermined bending point is realized, for example, by a reduction of the material thickness between the linking portions.

The first linking portion is advantageously fastened on the inner portion, whereas the second linking portion may be fastened on the wing portion.

On the outer side, the outer arch portion preferably merges without perceptible transition into the inner portion and into the wing portion.

The material thickness of the outer arch portion is advantageously chosen to be somewhat thinner than that of the inner portion and/or of the wing portion, so that the outer arch portion is elastically deformable without problems. The inner arch portion then acts among other ways in shape-imparting manner for the curvature of the outer arch portion in the assembled condition and is able to act as mechanical reinforcement. Moreover, the fire-protection effect may be intensified due to the chamber formed between the inner and the outer arch portion.

It would also be conceivable to form the arch portion with a single wall and to reduce the material thickness in the arch portion, in order to achieve an increased flexibility relative to the wing portion and the inner portion.

The arch portions should be configured in principle in such a way that they are easily deformable by the expansion forces during expansion and contraction of the joint and that they absorb the entire movement energy without imposition of load on the wing portions, for example.

The at least one intumescent element is preferably provided on the profile element on the inner side. The intumescent element may be cylindrically configured, especially with a rectangular cross section, e.g. as a fire-protection tape or as a foam element extending over the entire length of the fire-protection profile. In this case, the intumescent element is preferably disposed on the inner portion, advantageously in the vicinity of the junction point of the first linking portion with the inner portion.

In another variant, the intumescent element is provided as a layer, for example as an applied coating, which extends from the inner portion to the wing portion and which advantageously is provided at least on the inner side of the inner arch portion.

The fire-protection profile may have a spacer, which preferably is provided on the inner side of the inner portion. This spacer determines, for example, the position of a connecting element with respect to the profile element, wherein the connecting element embraces, for example, an upper end of the drywall. The spacer therefore defines the minimum distance between the wing portion and the connecting element, in order to provide an adequate movement margin for the arch portion.

As an example, the spacer may be formed by the intumescent element. However, it is also possible, independently of the intumescent element, to form the spacer on the inner side of the inner portion, preferably in one piece with the rest of the profile element. In this case, the intumescent element may also be positioned between the spacer and the wing portion.

The wing portion preferably comprises a fastening portion, especially in the region of a free rim of the wing portion, via which the wing portion can be fixed securely and durably in simple manner to a wall surface of the drywall. The fastening portion has, for example, fastening holes, which make it easier to join the wing portion by clamps or adhesive bonding to the wall surface. Alternatively or additionally, the fastening portion may have a step on the outer side, which may be used advantageously to establish, using a spackling compound, a neat transition between the wall surface and the adjoining arch portion and thus to create an appropriate visual impression.

The fire-protection profile may be limited to an arch portion provided on one side and a wing portion adjoining it. Such a fire-protection profile may be used, for example, for drywalls having a width for which no matching prefabricated two-sided fire-protection profile is available.

In many cases, however, it is advantageous when the profile element has, on both sides with respect to its width, respectively an arch portion and an adjoining wing portion. The fire-protection profile is then preferably formed with mirror-image symmetry. Both arch portions and wing portions extend preferably over the entire length of the fire-protection profile perpendicular to the width of the fire-protection profile.

The profile element is preferably formed from plastic, so that it can be manufactured simply, for example by means of extrusion. This makes it possible to manufacture the profile element with constant cross section in any desired length. Moreover, due to the use of a suitable plastic material, the flexibility of the arch portion may be realized reproducibly to the desired extent.

In principle, it would also be conceivable to manufacture the profile element on the basis of an intumescent plastic, wherein the intumescent element would then be integrated directly into the profile element.

Moreover, the fire-protection profile may comprise a sealing element. This is preferably disposed on the outer side of the inner portion of the profile element and may be used to seal the fire-protection profile additionally relative to the building-structure part bounding the building-structure joint.

For fastening of a connecting element, the fire-protection profile can be equipped with an adhesive strip. This is then preferably placed on the inner side of the inner portion directed toward the connecting element, in order to simplify pre-assembly of the fire-protection profile on the connecting profile.

The use of an adhesive strip is advantageous in particular when the fire-protection profile has an arch portion and a wing portion only on one side, in order, for example, to position the connecting element at the desired position on the fire-protection profile.

The object mentioned hereinabove is also solved with a fire-protection joint assembly that has a fire-protection profile as was described hereinabove, as well as a connecting element of a wall, especially a drywall, that can be joined to the drywall. The connecting element has, for example, a channel profile.

The connecting element bears advantageously on the inner side of the inner portion and may be fastened durably there, e.g. by means of an adhesive strip described hereinabove. The connecting element may be pre-assembled on the fire-protection profile.

In order not to hinder free movement of the arch portion, however, this and preferably also the wing portion should not be in contact with the connecting element in the completely assembled condition. For this purpose, it is possible to use, for example, a spacer described in the foregoing, which limits a movement of the connecting element with respect to the inner portion in the direction of the arch portion.

The drywall normally comprises a studwork as well as, fastened laterally thereon, wall panels, especially gypsum boards. In this case, a room-side wall surface of the drywall is formed by an outer surface of the wall panels.

The fire-protection profile is preferably positioned in the building-structure joint in such a way that the inner portion of the profile element is situated opposite the joint-side end of the drywall and the arch portion and the wing portion are disposed laterally relative to the drywall. The profile element is then joined securely to the building-structure part, which permits early installation of the fire-protection profile during assembly.

The connecting element is slipped onto a free rim of the studwork, wherein the lateral limb of the connecting element is disposed between the studwork and the wall panels mounted thereon.

When the connecting element is securely joined to the fire-protection profile, the connecting element is advantageously disposed displaceably, at least in portions, between the studwork and the wall panel, in order to permit movement compensation when the building-structure joint expands or contracts. In general, the connecting element should be displaceable perpendicularly relative to the building-structure part bounding the building-structure joint, i.e. perpendicular to the ceiling in the case of a building-structure joint between a wall and a ceiling.

In the fire-protection joint assembly, preferably the wing portion bears at least in portions on a room-side wall surface of the drywall and is fastened durably there in particular as described in the foregoing.

In an inventive method for assembly of a fire-protection joint assembly as described hereinabove, the fire-protection profile and the connecting element are first fastened on a building-structure part, especially a ceiling. Thereafter a studwork of the drywall is installed. At least one wall panel is fastened on the studwork. Then the wing portion is fastened on the room-side wall surface of the wall panel, wherein the wing portion is adjusted toward the wall panel and in the process the arch portion is elastically deformed. After completed assembly, therefore, the profile element extends between the room-side wall surface and the building-structure part, wherein the fire-protection profile is fastened both on the drywall and on the building-structure part, so that the building-structure joint is completely closed by the fire-protection profile. Movement compensation is nevertheless possible, since the arch portion is flexible and the radius of the arch portion is changed when the joint expands or contracts. This radius change permits a joint movement over a relatively large path, without being perceived by the eye and sensed as annoying.

The transition from the wall surface to the wing portion may be made unsightly by spackling. Preferably, the material of the profile element is chosen such that is can be brushed with conventional wall paints and lacquers. The profile element may also be manufactured directly in a hue matching the color of the respective wall. Thus at least one portion of the outer side of the wing portion can be simply concealed.

The invention will be described in more detail hereinafter on the basis of several exemplary examples with reference to the attached drawings. In the drawings.

Figure 10:
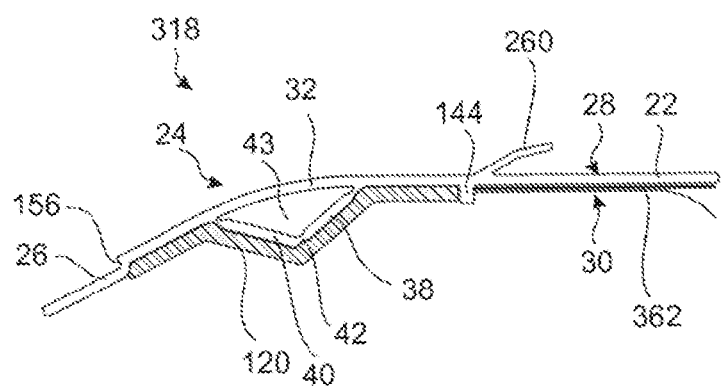
Figure 11:
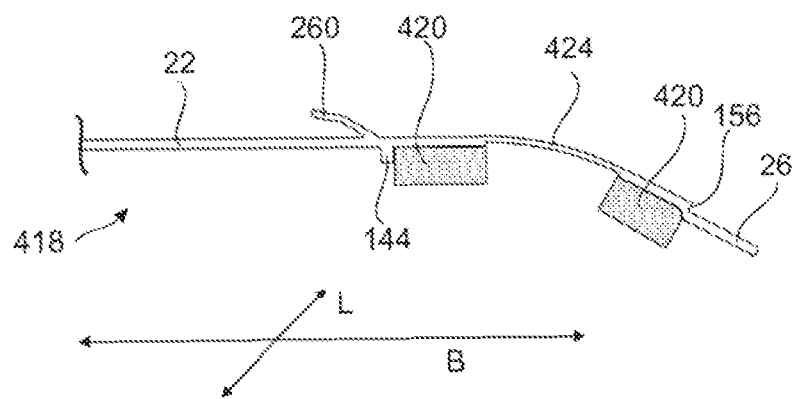

FIG. 10 shows a schematic sectional view of an inventive fire-protection profile for use in an inventive fire-protection joint assembly for assembly using an inventive method according to a fourth embodiment; and FIG. 11 shows a schematic sectional view of an inventive fire-protection profile for use in an inventive fire-protection joint assembly for assembly using an inventive method according to a fifth embodiment.

The figures show fire-protection profiles 10 for sealing of a building-structure joint 12 between a wall 14 and a building-structure part 16 in several embodiments. The individual embodiments differ substantially in details, wherein the use and also the method of assembly of the fire-protection profile are largely the same. In the following, therefore, the reference symbols allocated to identically structured or to substantially identically structured parts in the respective embodiments will also be used for the further embodiments.

For all embodiments, the principle of the invention will be explained on the basis of the first embodiment illustrated in FIGS. 1 to 6.

Fire-protection profile 10 is conceived for sealing, i.e. closing off completely (see FIGS. 3 to 6), a building-structure joint 12 between a drywall 14 and a building-structure part 16.

Instead of a drywall, the fire-protection profile 10 could also be used with a different wall type or in general with a different building-structure part. The building-structure part 16 is, for example, a particularly massive ceiling, but could also be, for example, a further wall.

Figure 1:
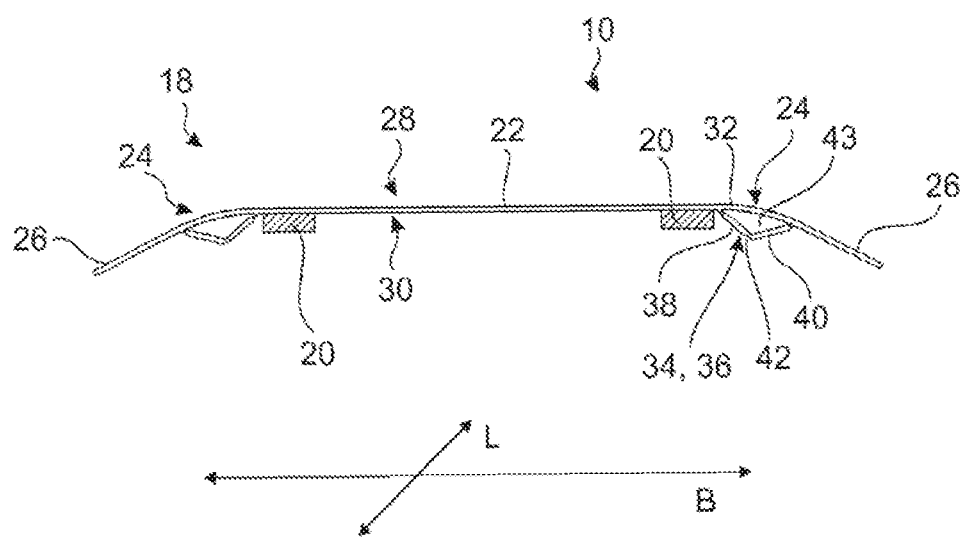
FIG. 1 shows a schematic sectional view of an inventive fire-protection profile for use in an inventive fire-protection joint assembly for assembly using an inventive method according to a first embodiment.

FIG. 1 shows a sectional view of fire-protection profile 10 along a transverse direction B (hereinafter treated as equivalent to a width B), wherein fire-protection profile 10 extends in longitudinal direction L into the plane of the figure, with substantially unchanged cross section over the entire length of building-structure joint 12.

Fire-protection profile 10 comprises a profile element 18 as well as at least one intumescent element 20. Profile element 18 determines the main shape of fire-protection profile 10, whereas intumescent element 20 in the embodiment shown here is provided only in portions over width B of fire-protection profile 10. In longitudinal direction L, however, all intumescent elements 20 provided in fire-protection profile 10 extend over its entire length.

Any suitable material that swells under the action of heat may be used as intumescent material. As an example, intumescent element 20 consists in this embodiment of a fire-protection tape, which is manufactured separately from profile element 18 and which is applied on profile element 18 over the entire length L of fire-protection profile 10. An intumescent element 18 of a suitable foam could also be used. It would also be conceivable to manufacture the entire fire-protection profile 10 from an intumescent plastic.

Profile element 18 can be extruded from a suitable plastic and thus be fabricated in any desired lengths along its longitudinal direction L, in principle as an endless tape.

In general, fire-protection profile 10, viewed along width B, has a flat inner portion 22 having substantially constant material thickness, on which an arch portion 24 as well as a wing portion 26 adjoin on at least one side, wherein wing portion 26 merges into arch portion 24.

In the exemplary embodiment shown here, profile element 18 is designed with mirror-image symmetry, and so, on both sides, inner portion 22 merges into an arch portion 24 and then into a wing portion 26. Wing portions 26 may be shorter on the whole (respectively relative to width B) than inner portion 22, and likewise be formed in flat manner and with substantially constant wall thickness. Alternatively, wing portions 26 may also be longer on the whole (respectively relative to width B) than inner portion 22, and likewise be formed in flat manner and with substantially constant wall thickness.

In contrast, the two arch portions 24 are flexible, so that wing portions 26 may be pivoted around arch portions 24 with respect to inner portion 22, and in particular may be folded down by approximately 90°.

An outer side 28 of profile element 18 is provided for the purpose of being fixed to building-structure part 16, whereas inner side 30 of profile element 18 situated opposite outer side 28 is directed toward drywall 14.

Figure 4:
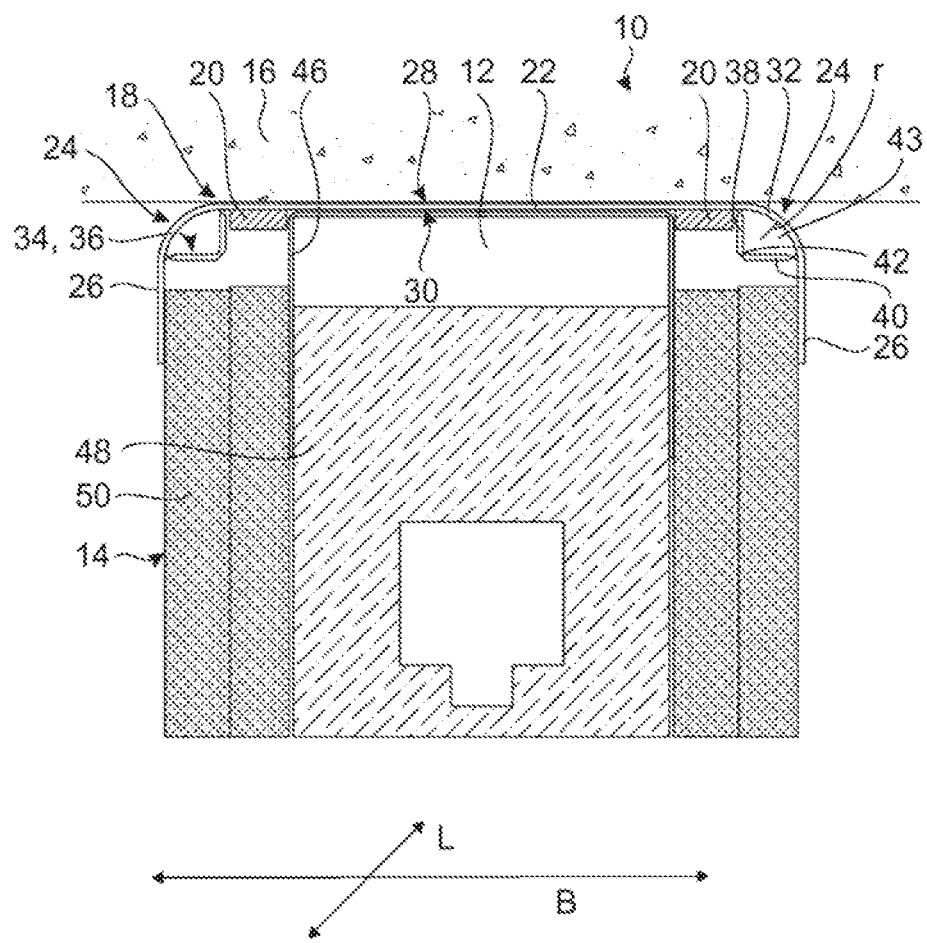
FIG. 4 shows the assembly from FIG. 3 according to a second assembly step.
Figure 5:
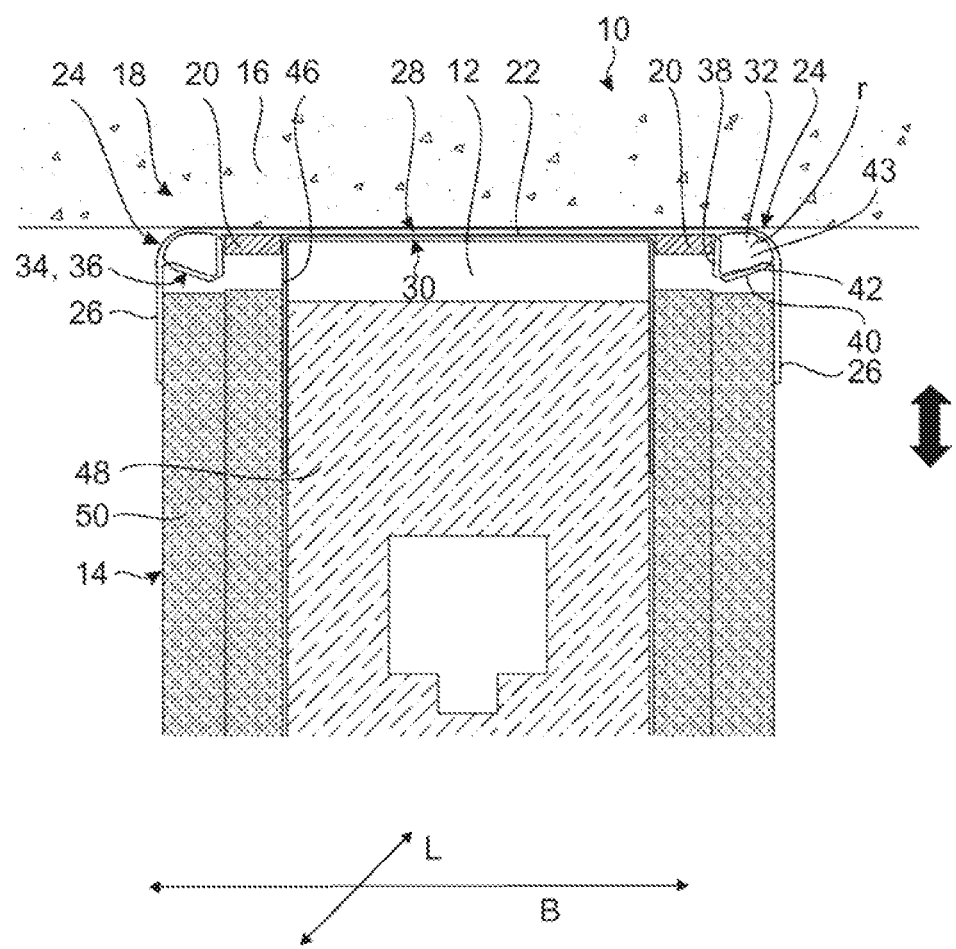
FIGS. 5 and 6 show the assembly from FIG. 4 in situations in which the building-structure joint has respectively contracted and expanded.
Figure 6:
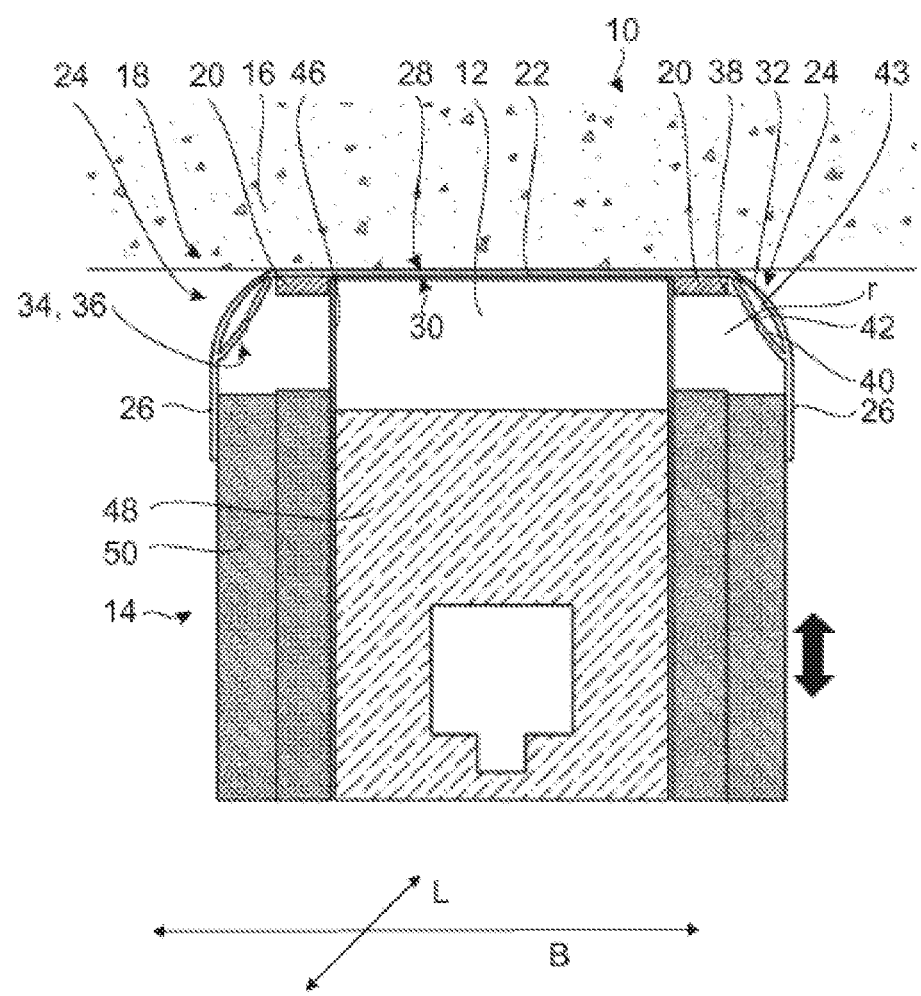

In the assembled condition, which is illustrated in FIGS. 4 to 6, wing portions 26 are respectively situated on both sides of drywall 14.

In arch portions 24, the wall thickness may be changed compared with inner portion 22 and/or wing portion 26.

In the first embodiment, arch portion 24 is of double-walled construction. An outer arch portion 32 is disposed here in one piece and without perceptible transition between inner portion 22 and wing portion 26, while an inner arch portion 34 extends on inner side 30 underneath outer arch portion 32. Inner arch portion 34 has the form of a strut 36, which has a first and a second linking portion 38, 40, which merge into one another at a predetermined bending point 42. First linking portion 38 is joined at its other end to inner portion 22, whereas second linking portion 40 is joined to wing portion 26. The two arch portions 32, 34 enclose between themselves a chamber 43 extending in longitudinal direction L.

Inner arch portion 34 is made here in one piece with the rest of profile element 18.

The material thickness in outer arch portion 32 is chosen such that the entire arch portion 24 may be folded with little force effort away from building-structure part 16 toward inner side 30 of profile element 18 (downward in the figures).

In this example, two intumescent elements 20 in the form of fire-protection tapes with rectangular cross section are provided, which extend along longitudinal direction L and are fixed in a manner directly adjoining the junction point of first linking portion 38 of strut 36 with inner portion 22 on inner side 30 of inner portion 22.

Figure 2:
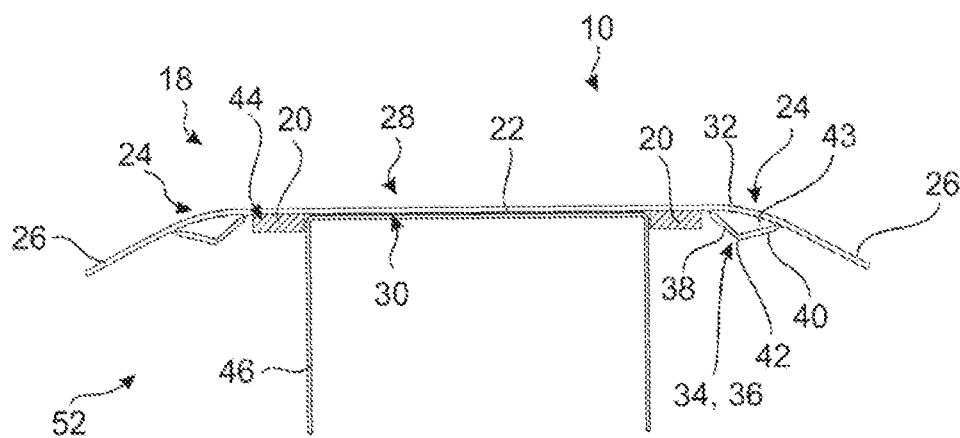
FIG. 2 shows the fire-protection profile from FIG. 1 with a connecting element assembled thereon.
Figure 3:
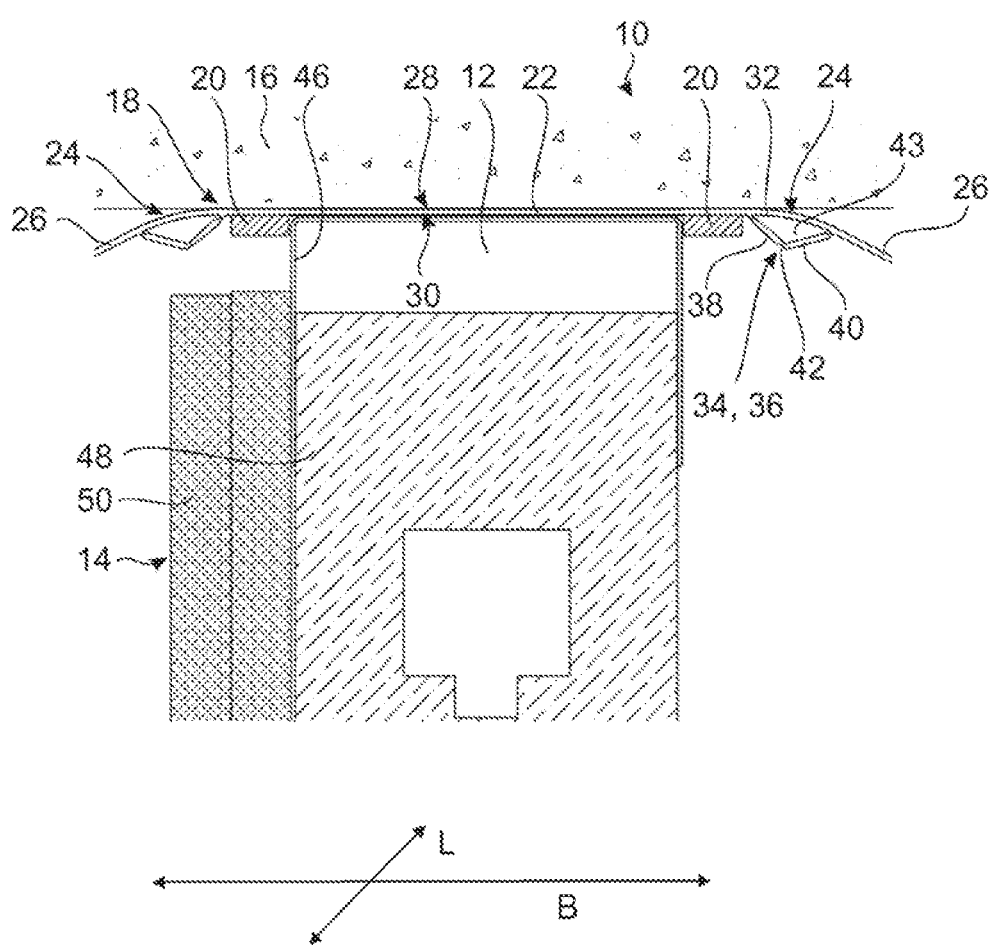
FIG. 3 shows the assembly from FIG. 2 in a first assembly step fastened on a building-structure part and placed on a wall.

Here, the two intumescent elements 20 form a spacer 44, which defines the position of a connecting element 46 with respect to profile element 18 and which limits a displacement of connecting element 46 toward arch portions 24 (see, for example, FIGS. 2 and 3).

Connecting element 46 is, for example, a channel profile that is able to embrace a free rim of a studwork 48 of drywall 14.

As can be seen in FIG. 3, for example, drywall 14 comprises not only a studwork 48 but also one or more wall panels 50, especially gypsum boards, which are assembled laterally on studwork 48.

For assembly of fire-protection profile 10, connecting element 46 is first fixed in appropriate manner on inner side 30 of inner portion 22 of profile element 18 (see FIG. 2).

Then fire-protection joint assembly 52 obtained in this way is fastened appropriately on building-structure part 16, so that connecting element 46 protrudes from building-structure part 16.

Studwork 48 of drywall 14 is fitted into connecting element 46, although this is not joined to studwork 48 but instead remains displaceable relative to it, in order to permit expansion movements of drywall 14 or of building-structure part 16. Between the free end of studwork 48 and building-structure part 16, building-structure joint 12 is formed, which is to be closed by fire-protection profile 10.

On the outer side of studwork 48, one or more wall panels 50, which likewise are joined only to studwork 48 but not to connecting element 46, so that connecting element 46 is also able to be displaced relative to wall panels 50, are assembled on one side or on both sides.

In the next assembly step, the two wing portions 26 are folded down and fastened on wall panels 50 at fastening portions 54 on the end sides. This may be done, for example, by adhesive bonding or clamping. For this purpose, openings may be provided in fastening portions 54. This condition is illustrated in FIG. 4.

The transition from the wall surface of wall panel 50 to wing portion 26 may be brushed with conventional wall paints and/or lacquers. It is also possible to fill this transition with a spackling compound 58, in order to smooth over the edge caused by the rim of wing portion 26 (see FIG. 8).

Profile element 18 is joined securely to building-structure part 16 at outer side 28 of inner portion 22, and securely to the wall surface of outer wall panel 50 at the inner side of the respective wing portion 26. These fastening points are not displaced relative to the respective building parts when building-structure joint 12 becomes smaller or larger, i.e. when the distance between building-structure part 16 and the upper rim of studwork 48 changes. In these cases, the two arch portions 24 become deformed, wherein the radius of curvature r of outer arch portion 32 as well as the angle between first and second linking portions 38, 40 at predetermined bending point 42 changes (see FIGS. 4 to 6). Thus, if building-structure joint 12 shrinks, strut 36 is able to fold together, wherein the angle between linking portions 38, 40 becomes smaller (see FIG. 5), or else it is able to stretch out if building-structure joint 12 becomes larger (see FIG. 6).

Correspondingly, the radius of curvature r of outer arch portion 12 changes, although in no condition does the outer side of outer arch portion 32 form a kink or a fold, but instead always presents a smooth surface and a rounded transition from inner portion 22 to wing portion 26.

Figure 7:
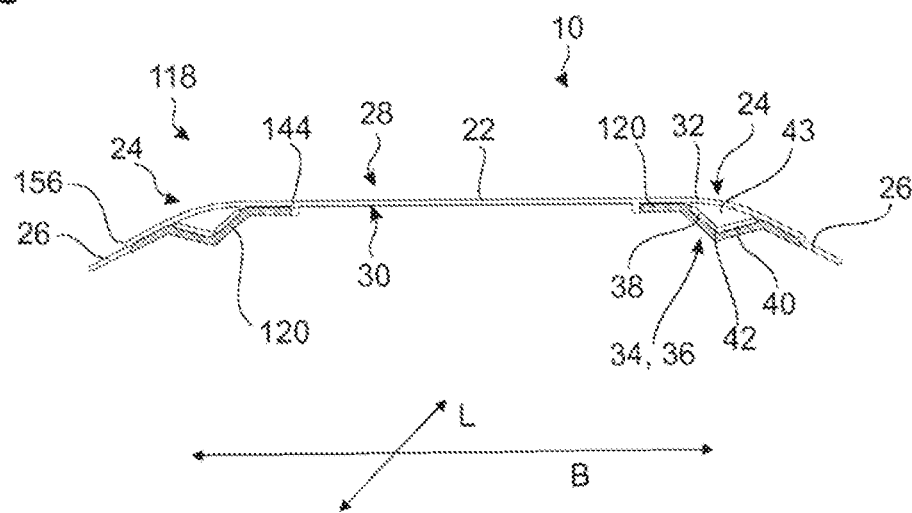
FIG. 7 shows a schematic sectional view of an inventive fire-protection profile for use in an inventive fire-protection joint assembly and for assembly using an inventive method according to a second embodiment.
Figure 8:
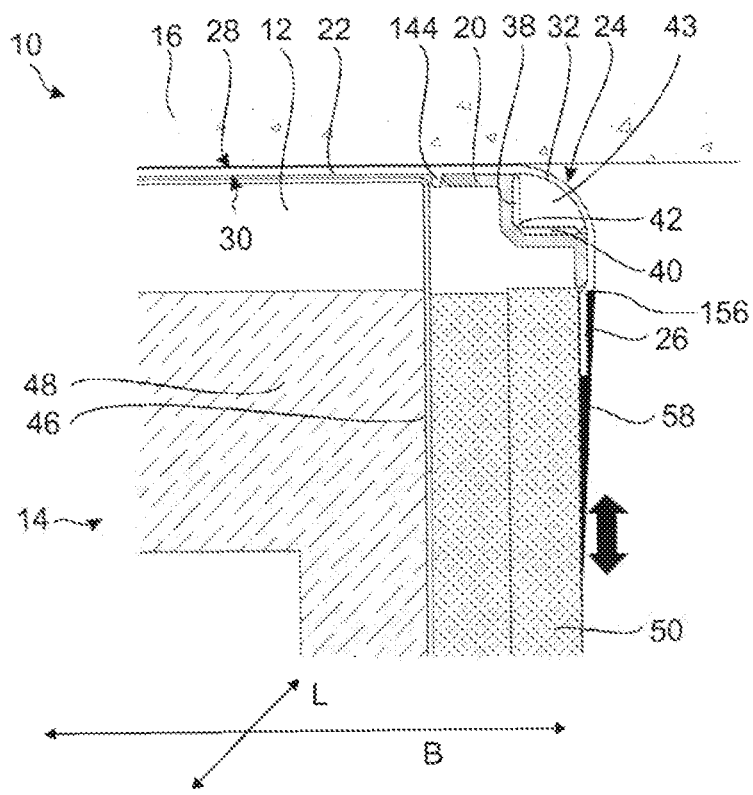
FIG. 8 shows the fire-protection profile from FIG. 7 in finish-assembled condition between a building-structure part and a wall.

In the second embodiment, illustrated in FIGS. 7 and 8, of a fire-protection profile 10, profile element 118 is designed in a manner substantially identical to that of profile element 18 of the first embodiment. The single difference lies in that spacers 144 are configured as projections, made in one piece with profile element 118, protruding from inner side 30 of inner portion 22, and that, in fastening portion 54 of the two wing portions 26, a step 156 is formed that facilitates the achievement of an inconspicuous transition from wall panel 50 of profile element 118 when spackled with spackling compound 58 (see FIG. 8).

Furthermore, intumescent element 120 is applied here as a thin layer on inner arch portion 34, and it completely covers strut 36 as well as adjoining portions of inner side 30 of inner portion 22 and of the inner side of the respective wing portion 26. If inner arch portion 34 becomes deformed, so also does intumescent element 120 become deformed.

All features of all described embodiments may naturally be combined with one another or exchanged for one another within the discretion of the person skilled in the art.

Figure 9:
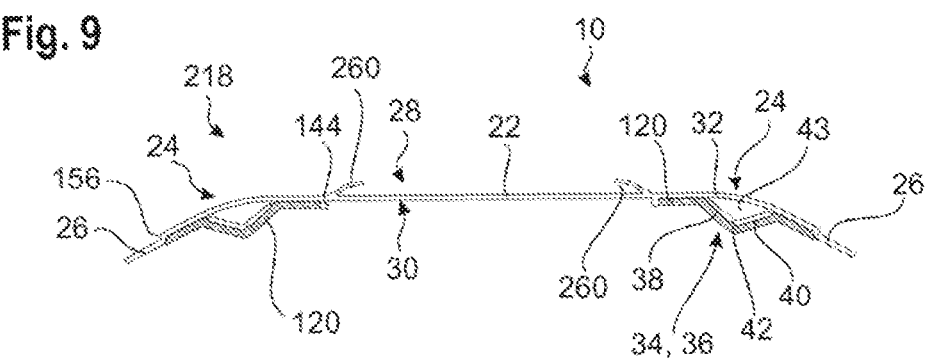
FIG. 9 shows a schematic sectional view of an inventive fire-protection profile for use in an inventive fire-protection joint assembly for assembly using an inventive method according to a third embodiment.

FIG. 9 shows a third embodiment, in which profile element 218, in contrast to the second embodiment just described, has a sealing element 260 protruding from outer side 28 of inner portion 22 shortly before the transition of inner portion 22 into arch portion 24. This sealing element 260, after assembly, is situated between inner portion 22 of profile element 218 and building-structure part 16, and it provides for additional sealing.

Sealing element 260 here is disposed in the region of spacer 144, but on the opposite side of inner portion 22, although it could also be placed at another location. It is also possible that an adaptable foam material that is flat over its entire surface is adhesively bonded in the region of the inner portion.

In this example, sealing element 260 is made in one piece with the rest of profile element 218.

In the second and third embodiments, fire-protection profile 10 is also designed in mirror-image symmetry with respect to width B, so that a corresponding spacer 144 and, in the third embodiment, a sealing element 260 is provided on both sides.

FIG. 10 shows a fourth embodiment of a fire-protection profile 10, in which an arch portion 24 and a wing portion 26 are provided only on one side of profile element 318. This version of fire-protection profile 10 is suitable, for example, for cases in which a fire-protection profile 10 is to be provided only on one side of drywall 14. In order, for example, to permit simple fixation on a connecting element 46 (not illustrated), an adhesive strip 362 is provided, here a self-adhesive foil, which is disposed on inner side 30 of inner portion 22 and on which connecting element 46 may be adhesively bonded.

The profile elements of the other embodiments could also be designed such that they have an arch portion 24 and a wing portion 26 only on one side.

Finally, FIG. 11 shows a fifth embodiment of a fire-protection profile 10. Here, in contrast to the third and fourth embodiments, arch portion 424 of profile element 418 is configured only in single-walled manner, but in return has a thinner material thickness than inner portion 22 and wing portion 26.

Moreover, two intumescent elements 420, which respectively are disposed next to the transition of inner portion 22 into the material constriction of arch portion 424 and next to the transition of wing portion 26 into the material constriction, are provided here in the region of arch portion 424.

When wing portion 26 is folded down, one of the intumescent elements 420 then bears on wall panel 50 or on an upper rim of wall panel 50.

In FIG. 11, fire-protection profile 10 of the fifth embodiment is shown only as a one-sided profile, but it could equally well be two-sided and then be configured in mirror-image manner with respect to width B.

Otherwise, the functional principle and assembly are identical to those of the fire-protection profiles according to the preceding embodiments.

The invention claimed is:

1. A fire-protection profile for sealing a building-structure joint, said fire-protection profile, comprising:
    a profile element, said profile element comprising:
        an inner side,
        an outer side disposed opposite the inner side,
        an inner portion,
        at least one arch portion,
        at least one wing portion, wherein the at least one wing portion is joined to the inner portion via the at least one arch portion, and
        at least one intumescent element comprising intumescent material,
    wherein a radius of curvature of the at least one arch portion changes from a first radius to a second radius in an installed state of the fire-protection profile, the at least one arch portion changing from the first radius to the second radius based on a change in size of the building-structure joint.

2. The fire-protection profile according to claim 1, wherein the at least one arch portion has a wall thickness that is smaller at least in portions than the inner portion and/or the at least one wing portion.

3. The fire-protection profile according to claim 1, wherein the at least one arch portion is constructed in double-walled manner, the at least one arch portion comprising an inner arch portion and an outer arch portion, wherein the inner arch portion is formed as a strut having a first linking portion and a second linking portion and together with the outer arch portion forms a chamber.

4. The fire-protection profile according to claim 1, wherein the at least one intumescent element is provided on the profile element on the inner side, wherein the at least one intumescent element is provided on the inner portion and/or is provided as a layer that extends from the inner portion to the at least one wing portion.

5. The fire-protection profile according to claim 1, wherein a spacer is provided on the inner side of the inner portion.

6. The fire-protection profile according to claim 1, wherein the at least one wing portion comprises a fastening portion, and wherein the fastening portion has a step on the outer side and/or has fastening holes.

7. The fire-protection profile according to claim 1, wherein the profile element includes:
    two arch portions and two wing portions,
    wherein a first one of the arch portions and a first one of the wing portions is coupled to a first side of a portion corresponding to a width of the profile element and wherein a second one of the arch portions and a second one of the wine portions is coupled to a second side of the portion corresponding to the width of the profile element.

8. The fire-protection profile according to claim 1, wherein the fire-protection profile comprises a flame-retardant and intumescent material.

9. The fire-protection profile according to claim 1, wherein the profile element comprises plastic.

10. The fire-protection profile according to claim 1, wherein the fire-protection profile further comprises a sealing element.

11. The fire-protection profile according to claim 1, further comprising an adhesive strip coupled to the at least one wing portion, the adhesive strip attaching the at least one wing portion to a building structure in the installed state.

12. The fire-protection profile of claim 1, wherein the building-structure joint is a connecting joint between a drywall and a ceiling.

13. The fire-protection profile according to claim 1, wherein the at least one wine remains attached at a fastening point relative to a building feature in the installed state when the radius of curvature of the at least one arch changes from the first radius to the second radius.

14. A fire-protection joint assembly comprising a fire-protection profile according to claim 1 and a connecting element of a wall.

15. The fire-protection joint assembly according to claim 14, wherein the at least one wing portion is coupled to a room-side wall surface in the installed state.

16. The fire-protection joint assembly according to claim 15, wherein the wall comprises a studwork having at least one wall panel forming the wall surface, and wherein the connecting element is provided displaceably at least in part between the studwork and the wall panel.

17. The fire-protection joint assembly according to claim 14, wherein the wall is a drywall.

18. A method of assembling a fire-protection joint assembly according to claim 14, comprising:
    a) fastening the fire-protection profile and the connecting element on a building-structure part,
    b) installing the studwork,
    c) fastening the at least one wall panel to the studwork, and
    d) fastening the at least one wing portion on the room-side surface of the wall panel, wherein the at least one wing portion is adjusted toward the wall panel and the at least one arch portion is elastically deformed.

19. The method according to claim 18, further comprising:
    e) concealing at least one portion of the outer side of the at least one wing portion.

20. The method according to claim 18, wherein the building-structure part is a ceiling.

* * * * *